US012021339B2

(12) United States Patent
Fehling et al.

(10) Patent No.: US 12,021,339 B2
(45) Date of Patent: Jun. 25, 2024

(54) SPRING TERMINAL FOR CONDUCTOR

(71) Applicant: Weidmüller Interface GmbH & Co. KG, Detmold (DE)

(72) Inventors: Stephan Fehling, Lage (DE); Karlo Stjepanovic, Bielefeld (DE); Walter Hanning, Detmold (DE); Heike Schmidtpott, Bad Salzuflen (DE)

(73) Assignee: Weidmüller Interface GmbH & Co. KG (DE)

( * ) Notice: Subject to any disclaimer, the term of this patent is extended or adjusted under 35 U.S.C. 154(b) by 337 days.

(21) Appl. No.: 17/594,556

(22) PCT Filed: Apr. 23, 2020

(86) PCT No.: PCT/EP2020/061350
§ 371 (c)(1),
(2) Date: Oct. 22, 2021

(87) PCT Pub. No.: WO2020/224979
PCT Pub. Date: Nov. 12, 2020

(65) Prior Publication Data

US 2022/0190493 A1 Jun. 16, 2022

(30) Foreign Application Priority Data

May 3, 2019 (DE) .................... 10 2019 111 453.5

(51) Int. Cl.
*H01R 4/48* (2006.01)
*H01R 9/26* (2006.01)

(52) U.S. Cl.
CPC ..... *H01R 4/48365* (2023.08); *H01R 4/48455* (2023.08); *H01R 9/26* (2013.01)

(58) Field of Classification Search
CPC .. H01R 4/48365; H01R 4/48455; H01R 9/26; H01R 4/4821; H01R 4/4835; H01R 4/4833
See application file for complete search history.

(56) References Cited

U.S. PATENT DOCUMENTS

| | | | |
|---|---|---|---|
| 7,997,915 | B2 | 8/2011 | Pueschner et al. |
| 8,579,651 | B2 | 11/2013 | Hanning et al. |
| 2021/0057830 | A1 | 2/2021 | Fehling et al. |

FOREIGN PATENT DOCUMENTS

| | | | |
|---|---|---|---|
| DE | 102004001202 | A1 | 7/2004 |
| DE | 202010008028 | U1 | 12/2010 |

(Continued)

*Primary Examiner* — Jean F Duverne
(74) *Attorney, Agent, or Firm* — Laubscher & Fretwell, P

(57) ABSTRACT

A spring terminal, in particular a direct plug-in terminal, for connecting a conductor such as a flexible stranded conductor includes a housing with a chamber and an insertion channel for inserting the conductor into the chamber. A busbar and/or a clamping cage are arranged in the housing and a clamping spring is arranged in the chamber and acts as a pressure spring. The clamping spring includes a clamping limb, said clamping limb releasable out of a latching state by a pusher having a latching edge on which the pusher can be latched in the interior of the housing on a latching hook of the busbar or another element arranged in the housing in a latching state. The pusher holds the clamping spring in a latched manner in the open position, wherein the latching edge of the pusher can be released from the latching state by an opposite movement.

13 Claims, 21 Drawing Sheets

(56) References Cited

FOREIGN PATENT DOCUMENTS

| | | | | |
|---|---|---|---|---|
| DE | 102015120063 | B3 | * | 1/2017 |
| DE | 102015118574 | A1 | | 5/2017 |
| DE | 202017103185 | U1 | | 9/2017 |
| DE | 202017100038 | U1 | * | 5/2018 |
| EP | 2768079 | A1 | | 8/2014 |
| EP | 3358679 | A1 | | 8/2018 |
| WO | 2019174982 | A1 | | 9/2019 |

* cited by examiner

SPRING TERMINAL FOR CONDUCTOR

This application is a § 371 National Stage Entry of PCT/EP2020/061350 filed Apr. 23, 2020. PCT/EP2020/061350 claims priority of DE 10 2019111453.5 filed May 3, 2019. The entire content of these applications is incorporated herein by reference.

BACKGROUND OF THE INVENTION

The present invention relates to a spring terminal.

Such spring terminals designed as direct plug-in or push-in terminals with a clamping spring designed as a pressure spring, which pushes or presses a conductor against a busbar, are known in numerous embodiments. They differ primarily in their application, for example, as a function of the necessary current carrying capacity of the busbar, the spring force of the clamping spring and/or their installation conditions, in particular their construction size. Simple mounting and cost-effective production are always requirements for such a terminal.

BRIEF DESCRIPTION OF THE PRIOR ART

U.S. Pat. No. 7,997,915 B2 discloses a cable end sleeve at the end of which a direct plug-in terminal for the detachable connection of an electrical conductor is arranged. The direct plug-in terminal includes a current-carrying clamping cage for electrically contacting the electrical conductor and a spring for securing the electrical conductor. The spring has a pivotable clamping limb which, when the electrical conductor is not introduced into the direct plug-in terminal, is positioned on a holding edge, so that a free space for the electrical conductor is kept free and the conductor can be introduced into the clamping cage. When the direct plug-in terminal is introduced, the holding device is shifted so that the clamping limb is released and pivoted. The pivoted clamping limb pushes the electrical conductor onto the clamping cage.

From EP 2 768 079 A1, a development of this direct plug-in terminal is known in which the latching state can be reestablished by an actuation or pusher element after a release of the latched clamping limb by the conductor.

Furthermore, from DE 20 2017 103 185 U1 it is known that the clamping limb can be released out of the latching state by two different adjustment devices. Here, the latching state is not generated by latching an element on a free clamping edge of the clamping limb and the latching state is nevertheless releasable by introducing the conductor in the conductor insertion direction into the housing. The first of the two adjustment devices includes a movable release element on which the end of the conductor to be contacted acts during the release of the conductor and with which the clamping limb of the clamping spring is directly or indirectly releasable out of the latching state. The second of the two adjustment devices on the other hand is an actuation element for the direct movement of the clamping limb. Here, the actuation element can be latched jointly with the clamping limb of the clamping spring in the latching state, and it can be released directly out of the latching state, whereby the clamping limb of the clamping spring can also be released out of the latching state. The actuation element is a pusher for moving the clamping limb which can be shifted in the insertion direction in an actuation channel of the housing and moved to a limited extent perpendicularly to the insertion direction and which can be latched in the housing on a clamping edge of the housing in the latching state.

The spring terminal of DE 20 2017 103 185 U1 is itself tried and tested. Nonetheless, its construction design can be further optimized. The solution of this problem is the aim of the invention.

SUMMARY OF THE INVENTION

According to a primary object of the invention, a spring terminal, in particular a direct plug-in terminal, is provided for connecting a conductor which can be designed as a flexible stranded conductor. The terminal includes a housing with a chamber and an insertion channel for inserting the conductor into the chamber. The terminal further includes a busbar and/or a clamping cage. A clamping spring is arranged in the chamber and acts as a pressure spring for securing the electrical conductor on the busbar and/or the clamping cage in the region of a clamping site. The clamping spring includes a clamping limb which can be pivoted about a pivot axis which can be adjusted from a latching state, in which it is latched in a latching position, into a clamping state in which it is unlatched out of the latching state and pushes the electrical conductor against the busbar or the clamping cage. The latching state is generated by a pressure onto the clamping limb in the conductor insertion direction by a pusher. The clamping limb can be released out of the latching state by two different actuatable adjustment devices. The first of the two adjustment devices includes a movable release element on which the end of the conductor to be contacted acts during the release of the conductor and by which the second adjustment device and the clamping limb of the clamping spring can be released out of the latching state. The second of the two adjustment devices is the pusher for moving the clamping limb wherein the pusher can be shifted in an actuation channel of the housing in an insertion direction and moved to a limited extent perpendicularly to the insertion direction. The second release element is designed for the release of the pusher from the latching position and thereby also for the release of the clamping limb out of the latching state.

According to a preferred embodiment, the pusher includes a latching edge on which it can be latched—in the interior of the housing—on a latching hook of the busbar or on another element arranged in the housing in the latching state, wherein it correspondingly holds the clamping spring in a latched manner in the open position, wherein the latching edge can be released out of the latching state by an opposite movement.

The simple indirect latching of the clamping limb by latching the pusher on the busbar is advantageous. In this way, a latching edge on the housing is no longer necessary. The latching edge of the pusher is formed on a free end of the pusher arranged in the housing as a hook-shaped section of the pusher and/or the latching hook of the busbar is formed on a hook-shaped section of the busbar which is formed from the busbar, and in particular bent out of said busbar in particular on a section of the busbar which extends under the free end of the pusher in the housing. In this way, a particularly long lever arm is produced so that release from the latching position can be implemented with a very small pivoting angle of the pusher.

The release element can be arranged in the chamber laterally with respect to the pusher and can be designed so that it acts on the pusher for the release of the pusher from its latching position perpendicularly to the conductor insertion direction or substantially perpendicularly—i.e., at an angle of less than 45°, preferably less than 30°—to the conductor insertion direction. Then, in this way, the pusher can be released simply and reliably out of the latching state using particularly low forces, such as the forces which the conductor can exert under some circumstances only onto the release element which also releases the clamping spring out of the latching state.

The release of the open position or of the latching position of the clamping limb is possible in two ways. However, a spring terminal which can be released out of the latching state particularly easily is created with an improved construction design and operability.

For this purpose, the release element acts on at least one actuation contour of the pusher during the release of the latching state. This actuation contour can lie in the conductor insertion direction before the latching of the pusher on the busbar.

Moreover, the release element is designed as a rocker lever pivotably mounted in the housing with at least one lever arm and formed with a rotation axis. The pusher also has a rotation axis.

In an advantageous design, an actuation contour is provided on the pusher which acts together with an actuation/counter-contour of the release element for clamping an electrical conductor in the spring terminal and/or for releasing the electrical conductor out of the spring terminal. Preferably, the release element rotates from a base position about a rotation axis into a pivoting position. Preferably, in the base position, the actuation/counter-contour is arranged under the rotation pin of the release element. As a result, the spring terminal can be produced in a space saving manner.

The rotation directions of the pusher and of the release element are identical when the pusher is released out of the latching state. This arrangement is advantageous but not absolutely necessary. Thereby, a compact design of the release element can be implemented with two release paths by a release actuation by the conductor or a direct movement of the pusher by a tool from outside of the terminal or by hand.

In addition, the rotation axis of the pusher lies in the conductor insertion direction before the latching edge and above the clamping limb of the clamping spring and the rotation axis of the release element lies before the one or more actuation contours of the pusher in the conductor insertion direction.

It is advantageous that the latching state is not generated by latching an element on a free clamping edge of the clamping limb and that the latching state can be released by introducing the conductor in the conductor insertion direction into the housing and by the conductor acting on the release element or of the release element acting on the pusher perpendicular or substantially perpendicular to the insertion direction.

In order to reliably release of the pusher out of its latching position and thus release the clamping spring out of its associated latching, additional measures can be taken. Thus, the corresponding latching edges of the pusher and of the busbar or of the other element of the housing are designed as steps and/or hook-shaped elements. These elements can preferably include rounded edges and/or corresponding latching edge surfaces which, in the latched state, are oriented at an angle between 0 and 30°, preferably of 5 to 20° with respect to one another. In this way, the sliding of the pusher out of the latching state is simplified without the latching state being released. Overall, a self-retention in the region of the latching edge is maintained which the person skilled in the art can verify experimentally.

The spring terminal is suitable not only for solid conductors but also in particular for stranded conductors. This is the case since the stranded conductor can be shifted back and forth without splaying the strands in the latching state in the free space of the chamber in the housing. A material which has good electrical conductivity, for example copper or a copper alloy, can be chosen for the busbar. For the clamping spring, a spring steel is advantageous as manufacturing material.

According to a further object of the invention, a spring terminal, in particular a direct plug-in terminal, for connecting a conductor which can be designed as a flexible stranded conductor includes a housing with a chamber and with an insertion channel for inserting the conductor into the chamber, a busbar and/or a clamping cage, and a clamping spring acting as a pressure spring, arranged in the chamber. The clamping spring has a clamping limb which can be released out of the latching state at least by a pusher including a latching edge on which it can be latched in the latching state in the interior of the housing on a latching hook of the busbar or another element arranged in the housing. The pusher holds the clamping spring in the open position, wherein the latching edge of the pusher can be released out of the latching state by an opposite movement.

BRIEF DESCRIPTION OF THE FIGURES

Other objects and advantages of the invention will become apparent through a study of the following specification when viewed in the light of the accompanying drawing, in which:

FIG. 1 is a perspective view of a terminal block with two spring terminals according to the invention;

DETAILED DESCRIPTION

Figure 1B:
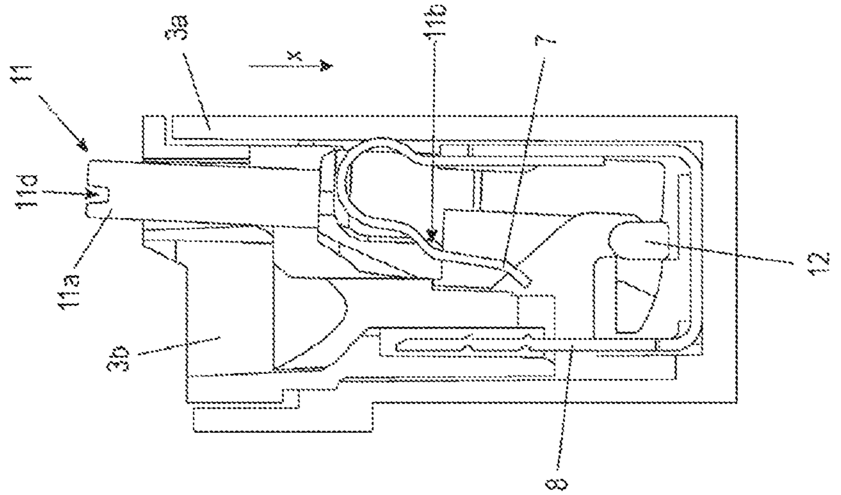
FIG. 1*b* is a sectional view of the spring terminal of FIG. 1*a* with the clamping limb in a latching state.
Figure 1A:
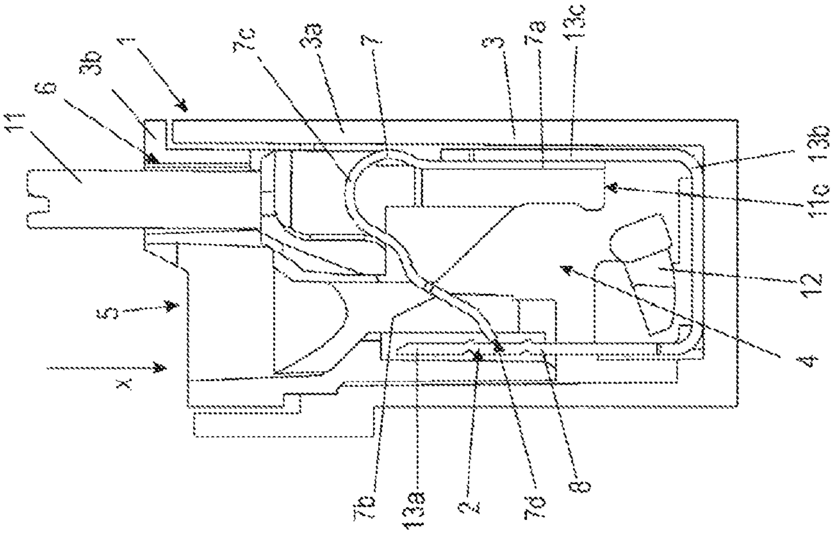
FIG. 1*a* is a cross-sectional view of a spring terminal with a clamping limb which is provided for clamping an electrical conductor which can be introduced into the spring terminal in an unlatched state.
Figure 2A:
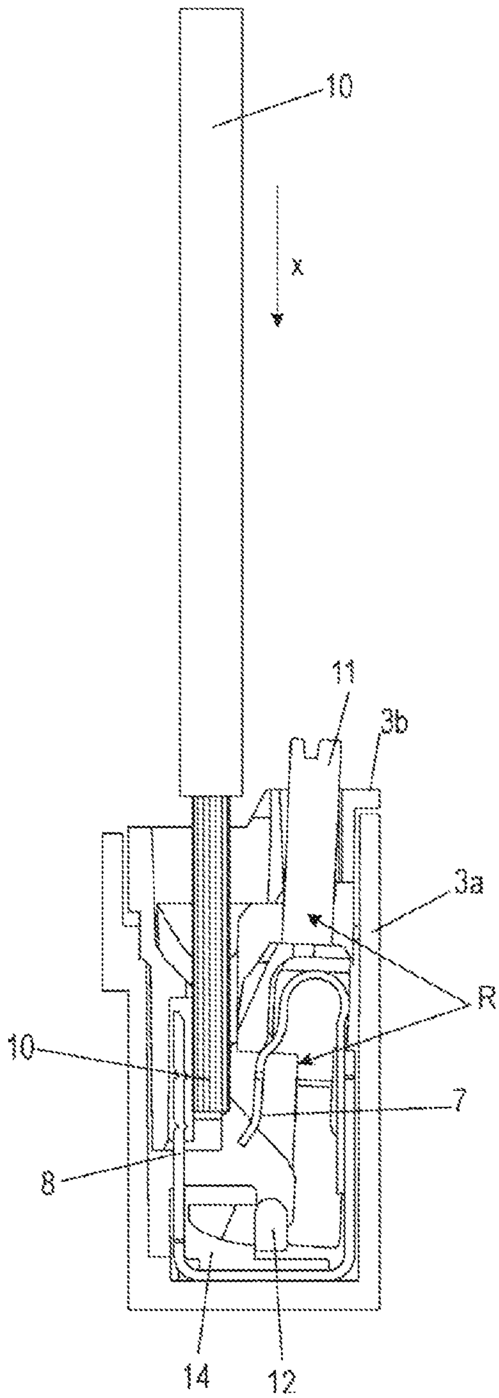
FIG. 2*a* is a cross-sectional view of the spring terminal of FIG. 1*b* with a conductor during introduction of the conductor into the spring terminal with the clamping limb in the latching state.
Figure 2B:
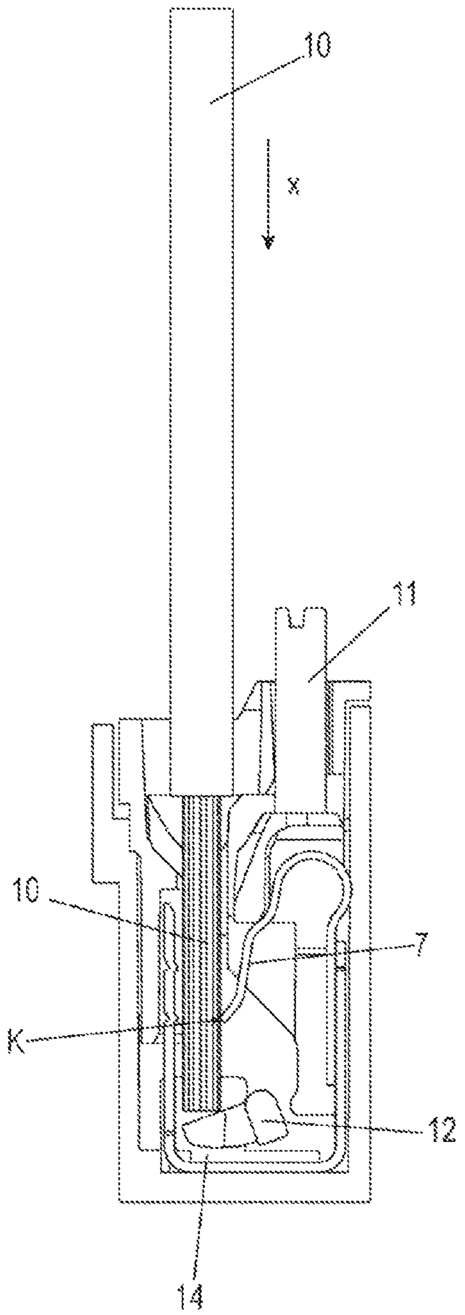
FIG. 2*b* is a sectional view of the spring terminal of FIG. 2*a* with an electrical conductor introduced into the spring terminal and the clamping limb released from the latching state.
Figure 3B:
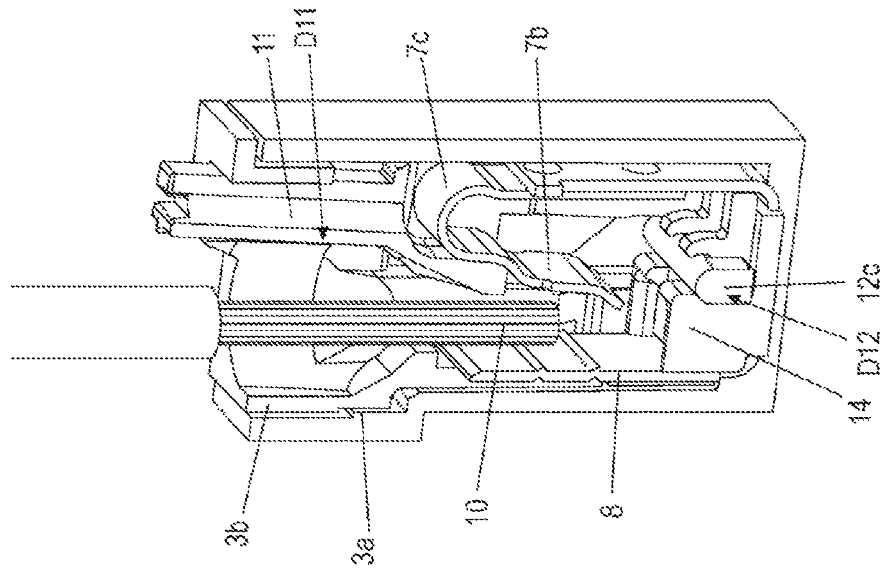
FIG. 3*b* is a perspective sectional view of the spring terminal of FIG. 3*a* during introduction of a conductor into the spring terminal with the clamping limb in a latching state.
Figure 3A:
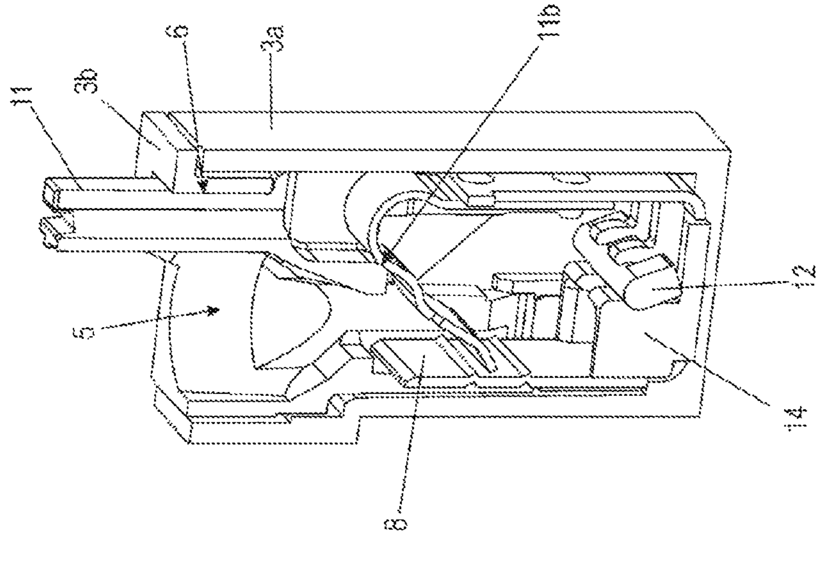
FIG. 3*a* is a perspective view in partial cross section of the spring terminal of FIG. 1*a;*
Figure 3C:
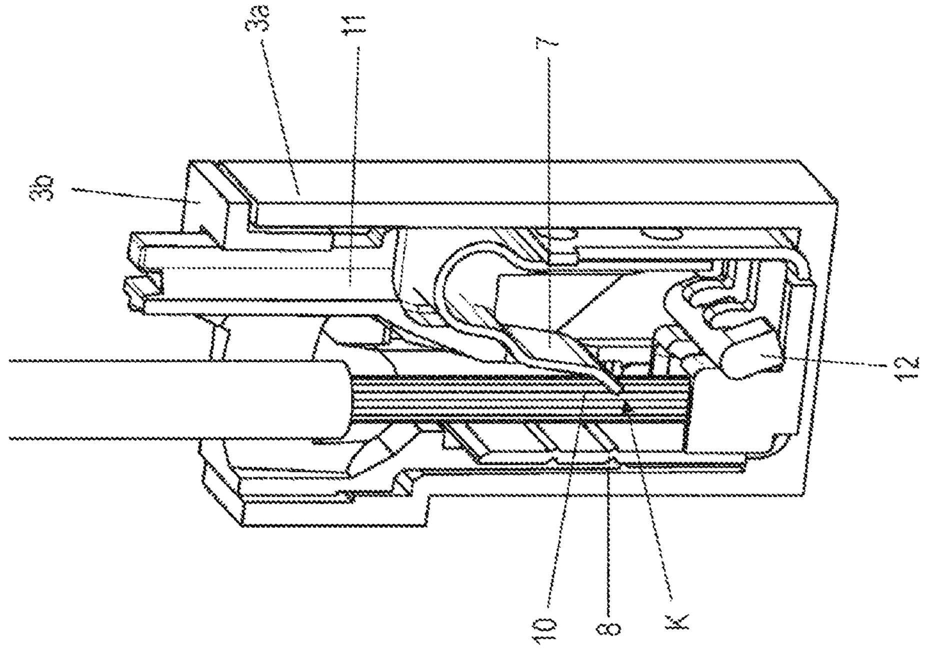
FIG. 3*c* is a perspective sectional view of the spring terminal of FIG. 3*b* with the clamping limb released from the latching state.

FIGS. 1*a* and 1*b*, FIGS. 2*a* and 2*b* as well as FIGS. 3*a*3*b* and 3*c* show a first spring terminal 1 in different views and "wiring states." To further understanding, the individual components or assemblies of these components are also shown in FIGS. 4*a*-4*h*, FIG. 5*a*, 5*b* and FIG. 6.

The spring terminal 1 includes a housing 3 in which a direct plug-in connection 2 (also referred to as "push-in connection") is formed. The housing 3 is preferably formed of an insulating plastic. The housing 3 can be designed in one piece or in multiple pieces. To that extent, reference is additionally made to the prior art in which different designs are described which can also be combined with the present invention. Thus, the housing 3 can be designed to be open on the side and it can be designed to be mountable side by side.

Figure 4D:
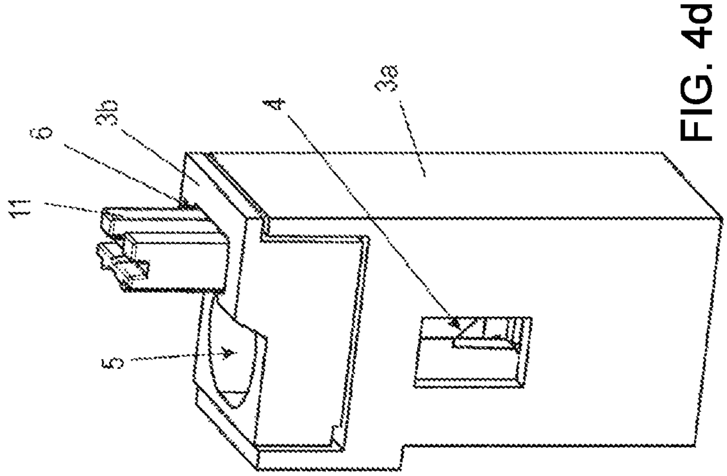
FIGS. 4*a*-4*j* are perspective views, respectively, of several components and component assemblies of the spring terminals from FIGS. 1 to 3.
Figure 4C:
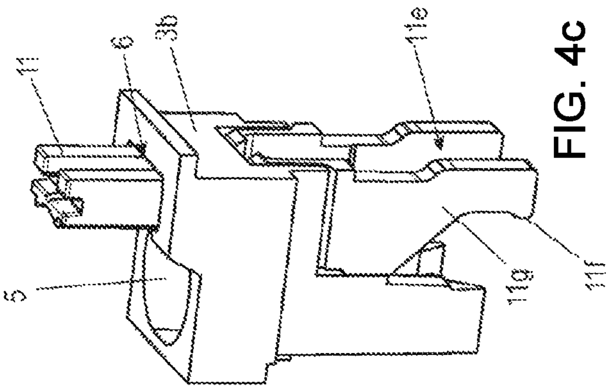
Figure 4B:
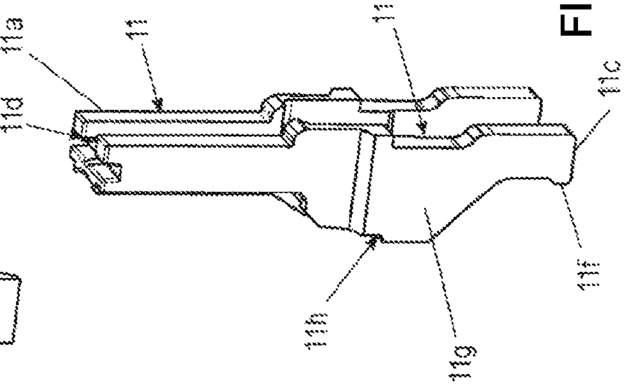
Figure 4A:
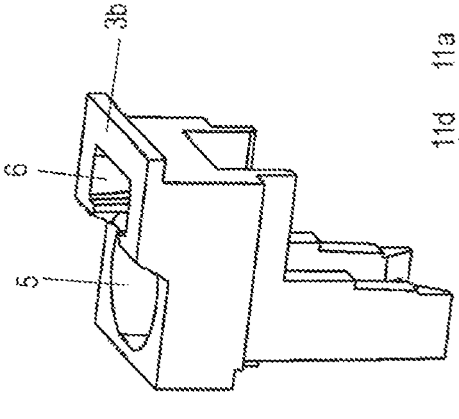
Figure 4J:
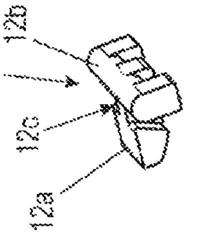
Figure 4H:
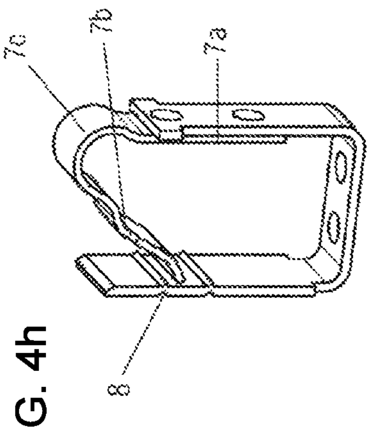
Figure 4I:
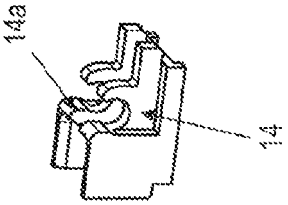
Figure 4G:
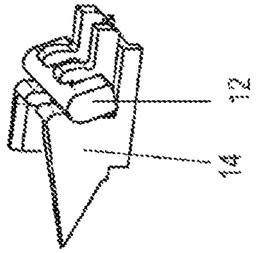
Figure 4F:
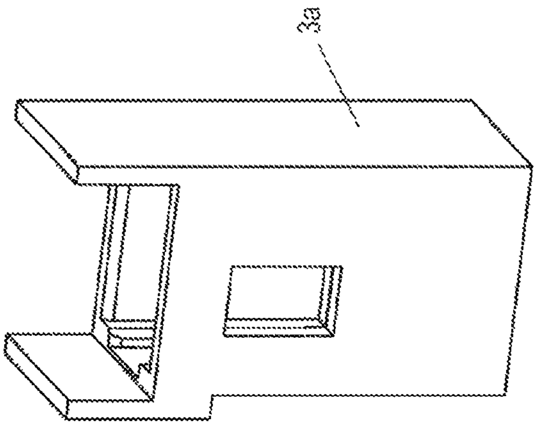
Figure 4E:
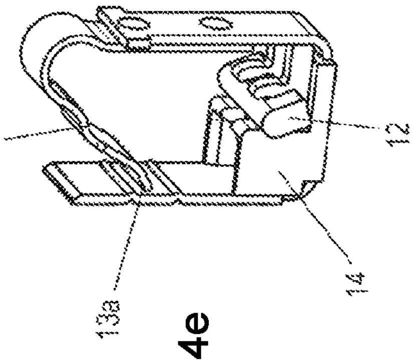

The housing 3—also shown in FIGS. 4*a*, 4*c* and 4*d*—includes a sleeve-like housing bottom part 3*a* which is substantially rectangular in cross section, on which the housing upper part 3*b* can be attached. The housing upper part 3*b* can be secured or latched on the housing bottom part 3*a* by a non-positive and/or positive connection.

In the housing 3, a chamber 4 is formed for receiving functional elements of the direct connections 2 which are preferably metal parts. In the embodiment shown, the chamber 4 is formed in the housing bottom part 3*a*. The chamber 4 can be open upward and optionally also open downward. At the top, the chamber 4 is closed by the housing upper part 3*b*. At the bottom, it can be designed to be closed or open to the extent that towards the bottom there can be an adjoining connection for connection with an outer electrical assembly. In that regard, reference is made to FIG. 9. Alternatively, the housing bottom part 3*a* can also comprise multiple chambers, multiple direct connections 2 and multiple housing upper parts or a housing upper part which correspondingly extends over multiple chambers (not shown).

On the one hand, the chamber 4 is connected by a conductor insertion channel 5 to one of the outer sides of the housing—so-called "insertion side," and, on the other hand, it is connected by an actuation channel 6. The actuation channel 6 extends substantially parallel to the conductor insertion channel 5. The actuation channel 6 can be designed to be cylindrical or stepped and/or conical. The conductor insertion channel 5 and/or the actuation channel 6 is advantageously formed in the housing upper part 3*b*. The conductor insertion channel 5 is used for the insertion of a conductor 10 in a conductor insertion direction X into the housing. The insertion channel serves as an introduction funnel. The conductor 10 includes a bare conductor end. It is used for the insertion into the direct plug-in connection 2 as shown in FIGS. 2*a* 2*b*.

For the formation of the direct plug-in connection 2, a clamping spring 7 and a busbar 8 are arranged in the chamber 4. Optionally, a clamping cage made of metal can be provided, which can be used for supporting the clamping spring 7 and/or the busbar 8. However, it is also possible to omit a clamping cage.

According to FIGS. 1*a* to 3*c*, a metallic assembly is provided which includes a clamping cage 13 shown in particular in FIGS. 1*a* and 2*a* in which the clamping spring 7 can be inserted. The clamping cage 13 is preferably U-shaped in a side view and includes three limbs 13*a*, 13*b*, 13*c*. Laterally, it is open, which is not a problem since the housing bottom part 3*a* centers the conductor 10.

The clamping spring 7 is placed between the limbs of the clamping cage 13. At least one of the limbs 13*a*, 13*b*, 13*c* can be used for connection to an electrical assembly (not shown) for connection to a plug or to a circuit board or the like. The busbar 8 is structurally identical to the clamping cage and particularly to the limb 13*a*.

The clamping cage 13 can be inserted with the clamping spring 7 from an open side into the housing bottom part 3*a*. In this manner, these elements can be pre-mounted on one another and thus easily further mounted in the housing, and the elements lie well protected in the housing bottom part 3*a*.

In any case, one limb 13*a* of the clamping cage 13 is formed by the busbar 8 which first extends in this section parallel to the conductor insertion direction X. Thereafter, it extends to the contact section itself under a clamping site K in a transverse limb 13*b* transversely to the conductor insertion direction X and then in a limb 13*c* extending again parallel to the conductor insertion direction X opposite the conductor insertion direction X.

The clamping spring 7 is designed to be U-shaped or V-shaped and it includes a supporting limb 7*a* and a clamping limb 7*b*. The supporting limb 7*a* is supported on an abutment. This abutment can be formed by a protrusion on a wall of the chamber 4. In the embodiment shown, it is formed by the limb 13*c* of the busbar 8.

The clamping limb 7*b* is connected via an arc-shaped back 7*c* to the support limb 7*a*. The back 7*c* can overlap a support contour of the housing 3, which protrudes into the chamber 4, although this is not necessary.

The pivotable clamping limb 7*b* acts on the respective conductor 10 with spring force in the region of the clamping site K (FIG. 2*b*) with a clamping edge 7*d* on its end and to push the conductor 10 or its bare conductor end against the busbar 8. In this way, an electrically conductive contact between the introduced conductor 10 and the busbar 8 is established. This can be readily seen in FIG. 1*b*.

The conductor 10 can be led in the conductor insertion direction X through the conductor insertion channel 5 into the chamber 4 in the region of the clamping site K (see FIG. 2*a* and FIG. 4*a*).

In the actuation channel 6, an actuation element is arranged. The actuation element is preferred as a pusher element—referred to in short as "pusher 11," which is shiftably guided in the actuation channel 6.

Preferably, a free end 11*a* of the pusher 11 protrudes outward over the outer side of the housing 3 so that it is easily accessible. This is advantageous but not absolutely necessary. Moreover, on this free end 11*a*, an actuation contour—in particular a recess 11*d*—can be formed for placing a tool, in particular a screwdriver, on the pusher 11. This recess 11*d* is preferably dimensioned so that a screwdriver can be inserted relatively firmly and far into the recess 11*d* as shown in FIG. 4*b* and FIG. 4*c*. However, the upper actuation end of the pusher 11 can also lie within the actuation channel 6.

The other end 11*c* of the pusher 11—which faces away from the actuation end —, protrudes into the chamber 4 and preferably in the lower half of this chamber. The pusher 11 moreover has a push contour 11*b*—between its two ends 11*a* and 11*c*. This push contour 11*b* is used for enabling one to exert a force onto the clamping limb 7*b* in the insertion direction with the pusher 11 in order to open the clamping limb 7*b*.

Under the first push contour 11*b*, the pusher 11 has a slot 11*e* in the manner of a passage opening or a lower recess with lateral walls as shown in FIGS. 4*b* and 4*c*.

The clamping limb 7*b* in the mounted state pushes through the slot 11*e* and can be pivoted to a limited extent within the slot 11*e*.

The pusher 11 moreover has an actuation contour 11*f* for action by a release element 12, to be described below.

Laterally with respect to the slot 11*e*, the pusher includes one or two arms 11*g* (see also FIG. 4), on the lower ends of which in each case the actuation contour 11*f* for the release element 12 is formed.

The pusher 11 includes a push contour 11*b* between the arms 11*g* on the upper edge of the slot 11*e*, wherein the pressure can be exerted on the clamping limb 7*b* by the push contour 11*b* in order to be able to exert pressure on the clamping limb 7*b* when the pusher 11 is pushed downward in the actuation channel 6 in conductor insertion direction X by the push contour 11*h* or by the push edge in order to pivot the clamping limb and distance it from the busbar 8 so that a conductor 10 can be introduced into the opened clamping site K.

The arms 11*g* of the pusher 11 extend laterally with respect to the clamping spring 7. In this way, a reliable release on the two arms 11*g* of the pusher 11 can be produced. This action in turn moves the pusher 11, which is supported in a latching manner on the housing 3, so that it is released from latching on the latching edge 31, whereby the pusher 11 is released and slides slightly upward in the actuation channel 6, opposite the insertion direction X due to the spring force of the released clamping limb 7*b*.

The at least one actuation contour 1 if is provided in the chamber 4 close to the end 11*c* of the pusher 11. It lies under the clamping site K.

Laterally next to the end 11*c* of the pusher 11 or above the end of the pusher—laterally with respect to the actuation contour 11*f* (with regard to a latching state with maximally inserted pusher 11)—, a movable release element 12 is arranged in the chamber 4.

In an advantageous—but not absolutely necessary—design, the release element 12 is designed as a rocker lever which includes two lever arms 12*a*, 12*b* which can be rotated about a rotation axis shown also in FIGS. 4*e*, 4*g*, 4*i*, and 4*j*. The rocker lever 12 can be designed as an angle lever. It can be mounted in a bearing housing 14 or on a bearing block or the like which is inserted in the chamber 4, for example, together with the busbar 8 and/or the clamping cage 13. For this purpose, the rocker lever 12 can have an axle 12*c* which is pivotably inserted in a bearing recess 14*a* of the bearing block 14. The lever arm 12*a* is used for actuation by the conductor by pushing down in the chamber 4, and the lever arm 12*b* is used for moving the pusher 11 for release out of the latching position.

The pusher 11 moreover includes at least one lateral step in the manner of an offset, on which a first latching edge 11*h* is formed. This latching edge 11*h* cooperates with a corresponding latching edge 31 on/in the chamber 4 of the housing 3. In order to form this latching edge 31, the housing upper part 3*b*, has a corresponding step.

The latching edge 11*h* is formed on the side of the pusher 11 facing the clamping limb 7*b*. This is advantageous but not absolutely necessary.

By pushing the pusher 11 into the actuation channel 6 in the insertion direction X, pressure can be exerted on the clamping limb 7*b* via the push contour 11*b*.

This is used, on the one hand, to open the clamping site K when the conductor is inserted in order to be able to remove the conductor 10.

Figure 5A:
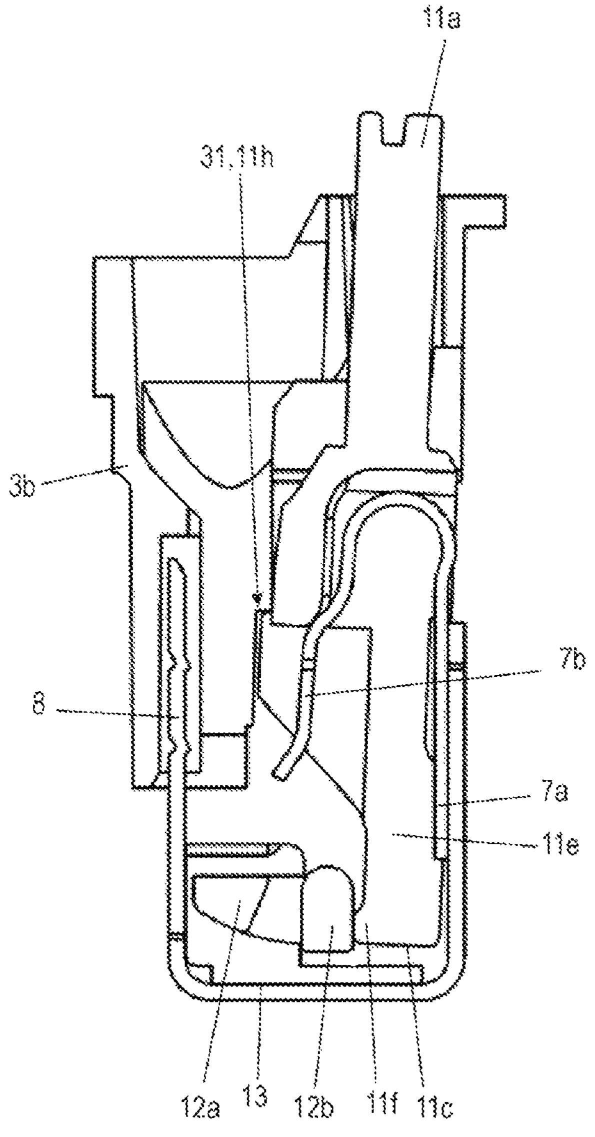
FIG. 5*a* is a cross-sectional side view of a spring terminal FIG. 1 in an assembled state without a housing bottom part in a latching state corresponding with FIG. 3*b;*
Figure 5B:
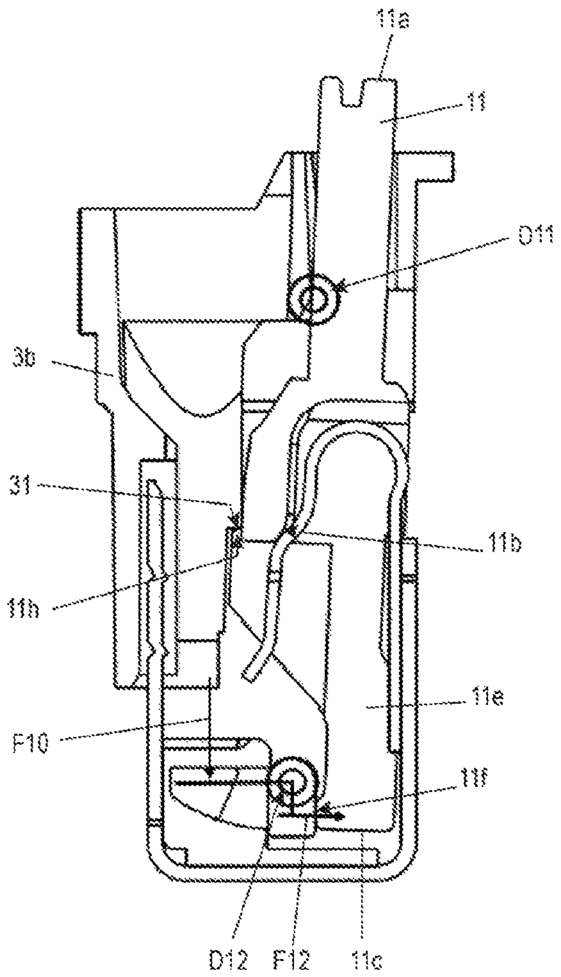
FIG. 5*b* is the cross-sectional side view from FIG. 5*a* including several force arrows and rotation axes.

Proceeding from the position of FIG. 1*a*, the pusher 11 serves another function. As soon as the pusher 11 or its latching edge 11*h* has been pushed sufficiently deep in the conductor insertion direction X that it passes the corresponding latching edge 31 of the housing 3, which is directed in the opposite direction, in the transition region from the actuation channel 6 to the chamber 4, the pusher 11 is shifted and/or pivoted to the side approximately perpendicularly to the insertion direction X for the conductor 10 by the force of the clamping spring 7 or of the clamping limb 7*b*. The latching edge 11*h* of the pusher 11 catches behind the corresponding latching edge 31 of the housing 3 as shown in FIGS. 5*a* and 5*b*. The latching edge 31 or step of the housing 3 lies on the housing upper part 3*b* as shown in FIG. 5*b*.

Thus, the pusher 11 has to be slightly shiftable and/or pivotable to a limited extent transversely to the insertion direction in the housing 3 or in the actuation channel 6. This shiftability and/or pivotability is preferably dimensioned at least in such a manner that, when the pusher 11 is pushed in, the latching edge 11*h* can be moved into the above-described latching position (see FIG. 5 and the pivot axis D11). The pivot axis D11 is the axis about which, in the case of superposed pivoting and linear movement during the release, the pusher rotates out of the latching position, when the release element acts on it. This pivot axis Dillies within the actuation channel 6. For this purpose, the actuation channel 6 does not have a cylindrical configuration, but instead has an at first slightly conically narrowing configuration in the conductor insertion direction X, and then again a widening configuration, wherein the rotation axis D11 can be formed by the application of the pusher 11 onto the transition region between the narrowing and then again widening region of the actuation channel 6 in the housing 3.

In this way, the clamping spring 7 or its clamping limb 7*b* can also be or is indirectly latched in an opened position in the housing 3 via catching of the pusher as shown in FIGS. 1*b* and 2*a*.

Catching occurs by pressure onto the clamping limb in the conductor insertion direction by the pusher 11 which is latched on the housing in a latching position, out of which it can, however, also be moved again, in order to release latching of the pusher 11 and thus also latching of the clamping spring 7.

In the latching position, the conductor 10 can simply be shifted into the region of the clamping site K. Since the pusher 11 itself is latched, the clamping spring 7 or its clamping limb itself is also held in an open position. Thus, a conductor end can be inserted. In order to contact the conductor end, the latching position must be released. The release of the opened position or of the latching position of the clamping limb 7*b* is possible in two different ways.

Since the latching state does not occur due to latching of an element on the free clamping edge 7*d*, that is to say on the end of the latching limb 7*b* on which the conductor is to be clamped, only a very small force is necessary for the release of the clamping limb out of the latching position. The invention makes use of this, in that it does not produce the latching position or the latched state on the free clamping edge 7*d* of the clamping limb 7*b*, but rather it produces the latching position or latched state by pressure by the pusher 11 onto the clamping limb 7*b* in the conductor insertion direction at a distance from the clamping edge, rather in the middle portion of the clamping limb 7. When the conductor 10 is formed, for example, as a very thin multiple strand conductor, with which only a very small force can be exerted onto the release element 12, the pusher 11 itself can be used directly in order to release the clamping spring 7 or its clamping limb 7*b* out of the latching position. The clamping spring 7 holds the pusher 11 in the latching position by its clamping limb 7*b*.

In terms of construction, this can be implemented in different ways. During actuation, for the release out of the latching position, the pusher 11, on its upper end, is moved, shifted or pivoted laterally perpendicularly to the insertion direction X on its upper end slightly in the housing 3 so that the latching edge 11*h* is moved out of the latching position on the latching edge 31 and latching of the pusher 11 on the housing 3 is released. Thereby, the latching position of the latching limb 7*b* is also released. In this way, the clamping limb 7*b* of the clamping spring 7 can relax and push the conductor 10 in the clamping site K against the busbar 8. This is performed manually or with a tool.

Figure 6:
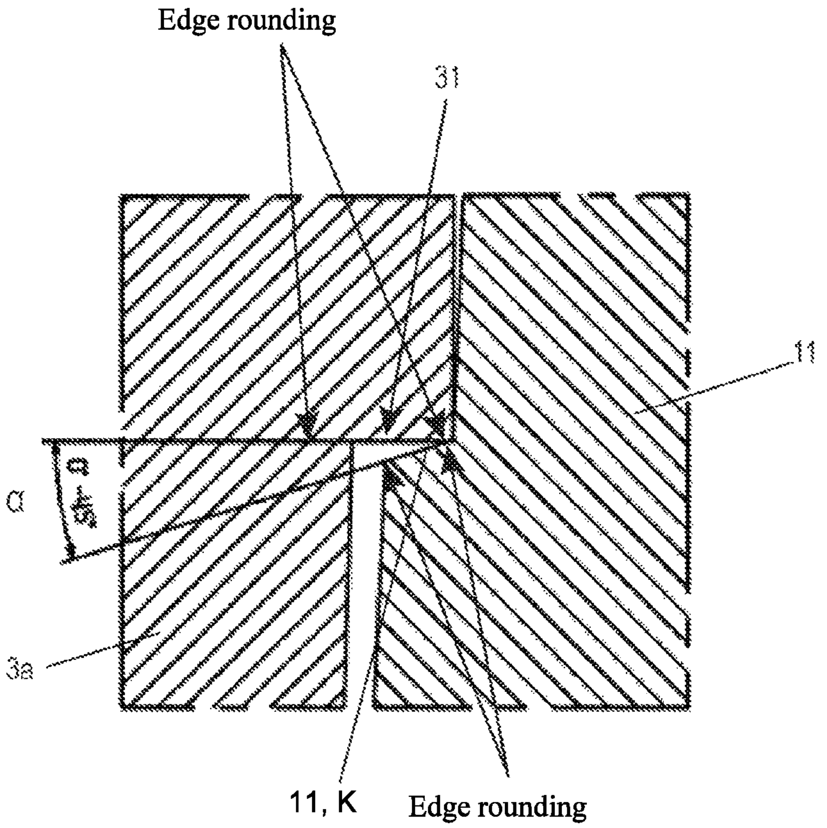
FIG. 6 is a detailed enlarged side view of a region of a latching edge between the housing and pusher in the latching state.

This region can be seen more precisely in FIG. 6. Radii are formed on the corner regions or edge regions in the region of the corresponding latching edge surfaces of the steps or latching edges 31 and 11*h* which are not too small so that the pusher 11 can easily be released from the housing. Preferably, the radii can be in the range between 0.1 mm and 0.2 mm. In addition, the latching edge surfaces which define the "latching edges" themselves, need not be oriented exactly parallel to one another—which is also possible—but can preferably be oriented with respect to one another slightly inclined at an angle greater than 1° to 45°, so that self-retaining locking is achieved but possibly also self-retention locking which is easier to release than locking with parallel surfaces and/or very small edge radii in the region of the latching edge surfaces.

Alternatively, with the conductor end of the conductor 10, a force F10 can be exerted in the conductor insertion direction X onto the release element 12 in order to release the pusher 11 out of the open position and thus out of the latching position. The conductor 10 pushes onto one of the two lever arms, namely the lever arm 12*a*. Thereby, the release element rotates about its rotation axis 12*c*, and the other lever arm 12*b* acts with a force F12 on the actuation contour 11*f* of the pusher 11. This action in turn moves the pusher 11 which is supported on the housing 3 so that it is released from latching on the latching edge 31, whereby the pusher 11 is released and slides slightly upward in the actuation channel 6 opposite the insertion direction X due to the force of the released clamping limb 7*b*.

This release of the latching position with the conductor end is the usual way of wiring the spring terminal 1. The above-described movement of the pusher 11 is an alternative solution if, for example, the conductor 10 is so flexible that sufficient force cannot be generated by it for actuation of the release element 12.

It is advantageous if the recess 11*d* on the end 11*a* of the pusher 11 protruding from the housing 4 is dimensioned sufficiently deep that a force can be exerted on the pusher 11 manually or preferably with an inserted screwdriver or another tool in order to release it from its latching position.

The pusher 11 can also include a step which corresponds to a step of the actuation channel 6 and produces an insertion limit for the pusher 11 in the conductor insertion direction X.

According to FIG. 4, the release element 12 is formed by an added subassembly to the assembly of the elements 13 and 7. This subassembly can be made purely of metal or purely of plastic, or of a mixture of elements made of metal and plastic. Here, the release element 12 includes a bearing block or a bearing housing 14 on which the release element 12 is pivotably mounted. This subassembly can be mounted beforehand on the clamping cage 13 and inserted together with the clamping cage and the busbar 8 in the housing 3.

The bearing block 14 can be designed as an element made of metal or plastic which is separate from the clamping cage 13 and which can be secured on the clamping cage 13 as shown in FIGS. 4*e*, 4*g*, 4*i*, and 4*j* and in turn includes recesses for the release element 12. However, it can also be formed by projections on the busbar.

The release element 12 includes the two lever arms 12*a*, 12*b*. Therefore, by the conductor end of the conductor 10, a force can be exerted in the conductor insertion direction X onto the release element 12 in order to release the pusher 11 from the open position and thus out of the latching position. The conductor 10 pushes on one of the two lever arms, namely the lever arm 12*a*. Thereby, the release element 12 rotates about its rotation axis 12*c*, and the other lever arm 12*b* acts as release contour on one or two corresponding actuation contours 11*f* of the pusher 11.

Preferably, one or more actuation contours of the release element 12 act at a right angle or substantially at a right angle (90° plus/minus 30°) on the pusher 11.

In this way, release of the pusher 11 and of the clamping spring using particularly small forces is possible. Thereby, in turn, the release reliability with regard to release by insertion of a conductor into the clamping site is increased.

Alternatively, the pusher 11 can be released directly out of the latching position by actuation on its upper end, as described above.

Preferably, the rotation directions of the pusher 11 and of the release element 12 are the same when the pusher 11 is released out of the latching position. This can be seen clearly in FIG. 5. Indeed, in FIG. 5, the (imaginary) rotation axes D11 and D12 of the pusher 11 and of the release element 12 are drawn.

The rotation axis D11 of the pusher 11 lies in the conductor insertion direction X before the latching edge of the pusher 11. In addition, it lies above the clamping limb 7*b* of the clamping spring 7 (above the insertion direction X before the clamping spring 7).

The actuation contours 11*f* on the other hand preferably lie at the height of or below the rotation axis of the release element 12 relative to the insertion direction X after the rotation axis D12.

Thereby, a compact design can be achieved, and it is also possible to structurally implement the orientation of the force application of the release element 12 perpendicularly or substantially perpendicularly onto the lever arm of the release element.

It is also conceivable to provide an additional element such as a shifting element for deflecting the conductor insertion force in the direction of the release force (not shown).

Figure 7:
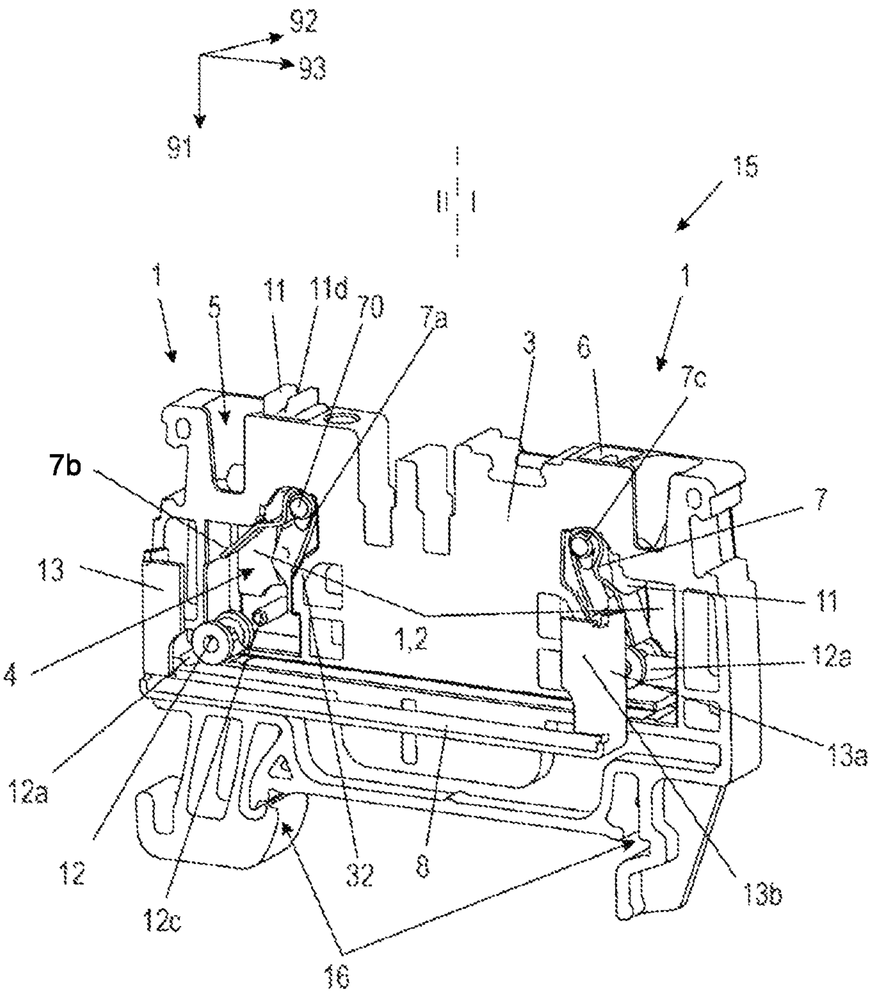

FIG. 7 shows a terminal block 15 with two spring terminals 1 according to the invention in a perspective view. The terminal block 15 includes an electrically insulating housing 3 which is open on one side preferably in the stacking direction, which includes the spring terminals 1 and which can be snapped onto a top-hat rail 160 (see FIG. 9). For snapping onto the top-hat rail 160, the housing 3 comprises a snap-on assembly 16.

The spring terminals 1 are arranged on opposite sides I, II of the terminal block 15 in a direction 93 transverse to the insertion direction 91 as well as transverse to a stacking direction 92.

The spring terminals 1 include the chamber in which the respective clamping spring is arranged. The back 7*c* of the clamping spring 7 loops around a portion of the bar 70 which forms the pivot axis for the clamping limb 7*b* of the clamping spring 7. During pivoting of the clamping limb 7*b* about the pivot axis, the supporting limb 7*a* of the clamping spring 7 is supported on a support contour 32 of the housing 3.

Each of the spring terminals 1 includes a pusher 11. This pusher is arranged in the actuation channel 6. The clamping limb 7*b* pushes through the slot 11*e* of the pusher. It is at least to a limited extent pivotable within the slot 11*e*. For the actuation of the clamping limb 7*b*, the pusher 11 has the push contour 11*b* by which it can exert pressure onto the clamping limb 7*b*.

Figure 10A:
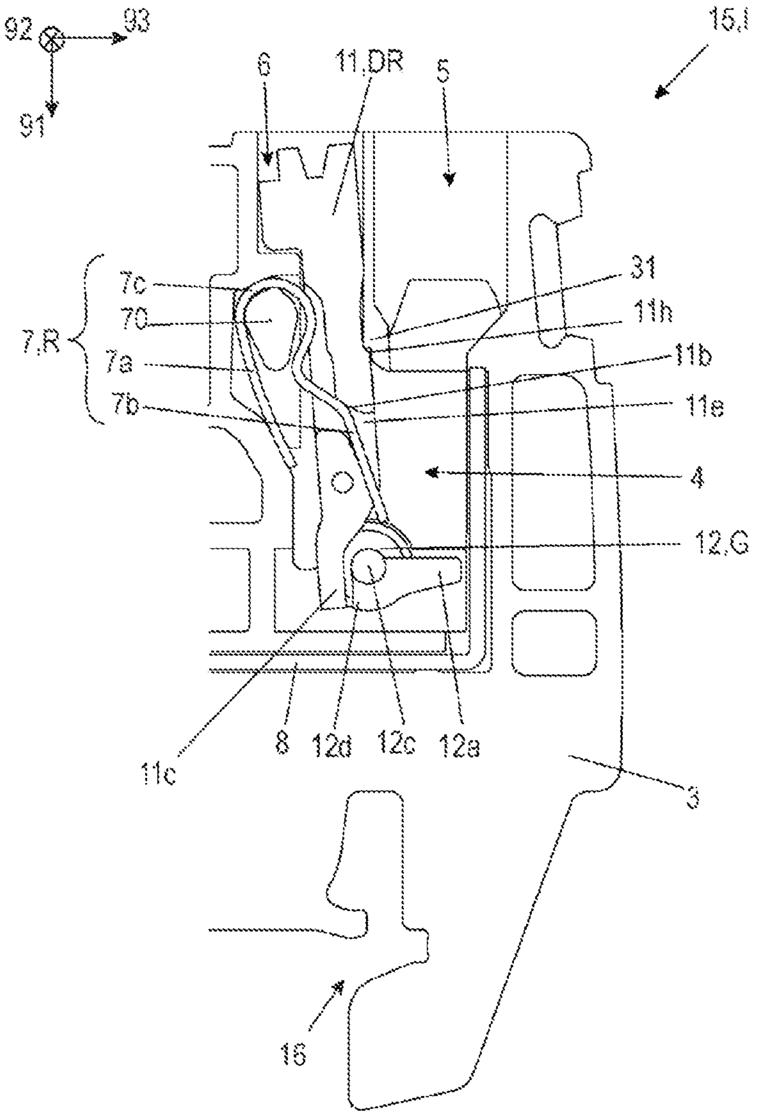
FIGS. 10*a-d* are partial side views of the terminal block according to FIG. 7 showing a first spring terminal in different stages, respectively.
Figure 10B:
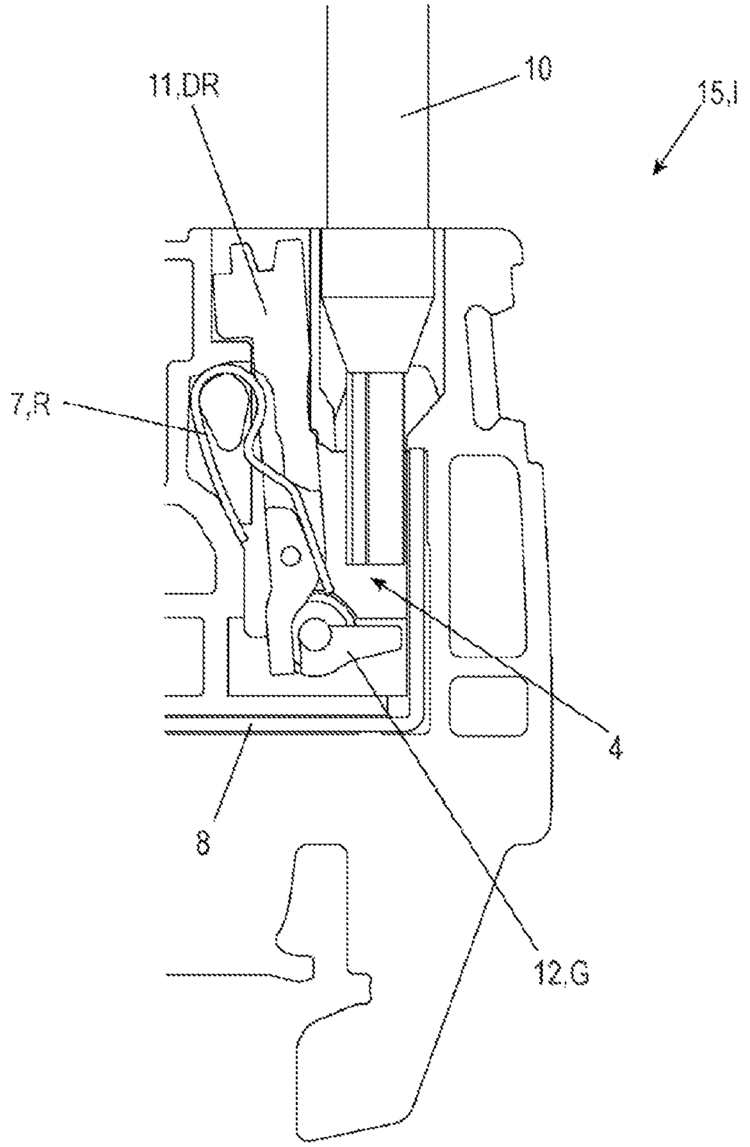
Figure 10C:
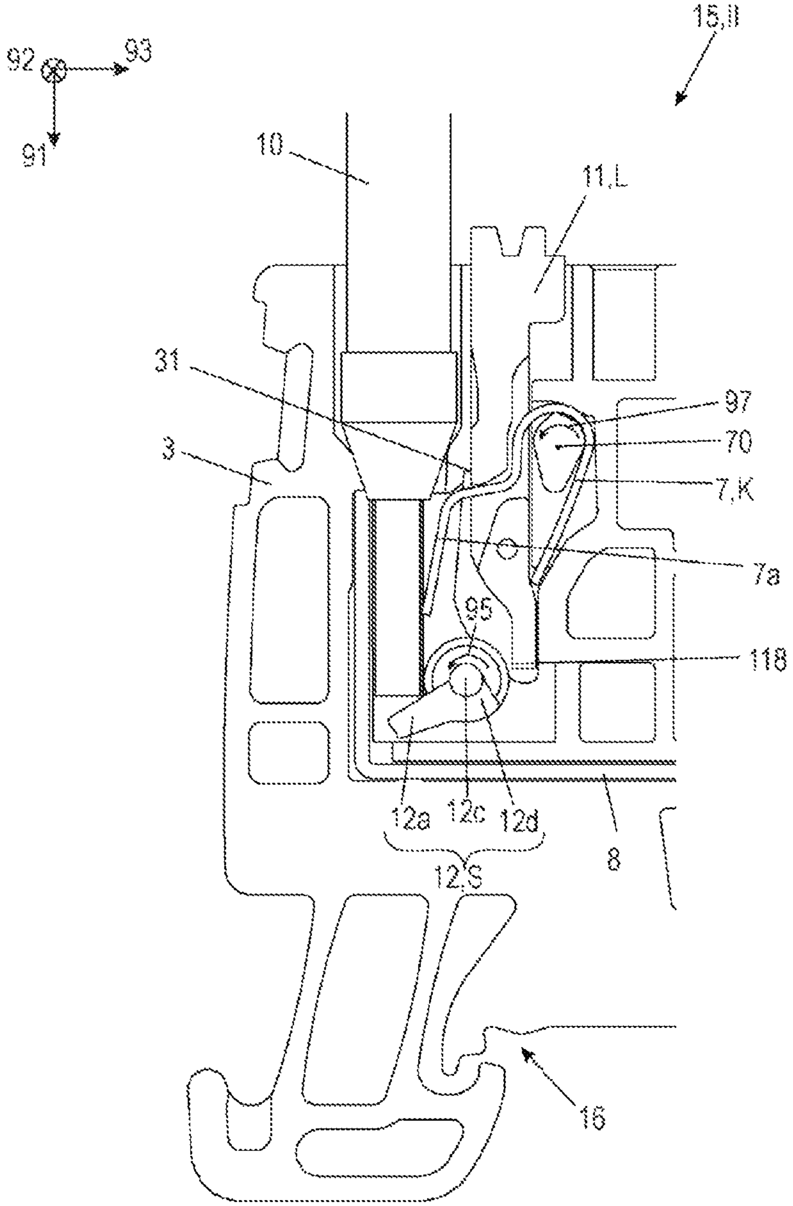

In addition, the pusher 11 includes an actuation contour 11*f* for acting on the release element 12 as shown in FIG. 10*c*.

The release element 12 is arranged for rotation about a pivot pin 12*c* which forms the rotation axis. It is described in further detail in the context of FIG. 8. The release element 12 of the spring terminal 1 arranged on the second side of the terminal block 15, which is the left side in the image plane, is represented in an exploded view and can be shifted by shifting in a stacking direction 92 onto its rotation pin 12*c*.

In addition, the spring terminals 1 of the terminal block 15 include in each case a clamping cage 13 with two limbs 13*a*, 13*b* arranged transversely with respect to one another. The clamping cages 13 of the terminal block 15 are connected to one another by a busbar 8. The clamping cages 13 too, as well as the busbars 8 connecting them to one another, are represented in an exploded view and can be shifted by shifting in a stacking direction 92 into the terminal block 15.

Figure 9:
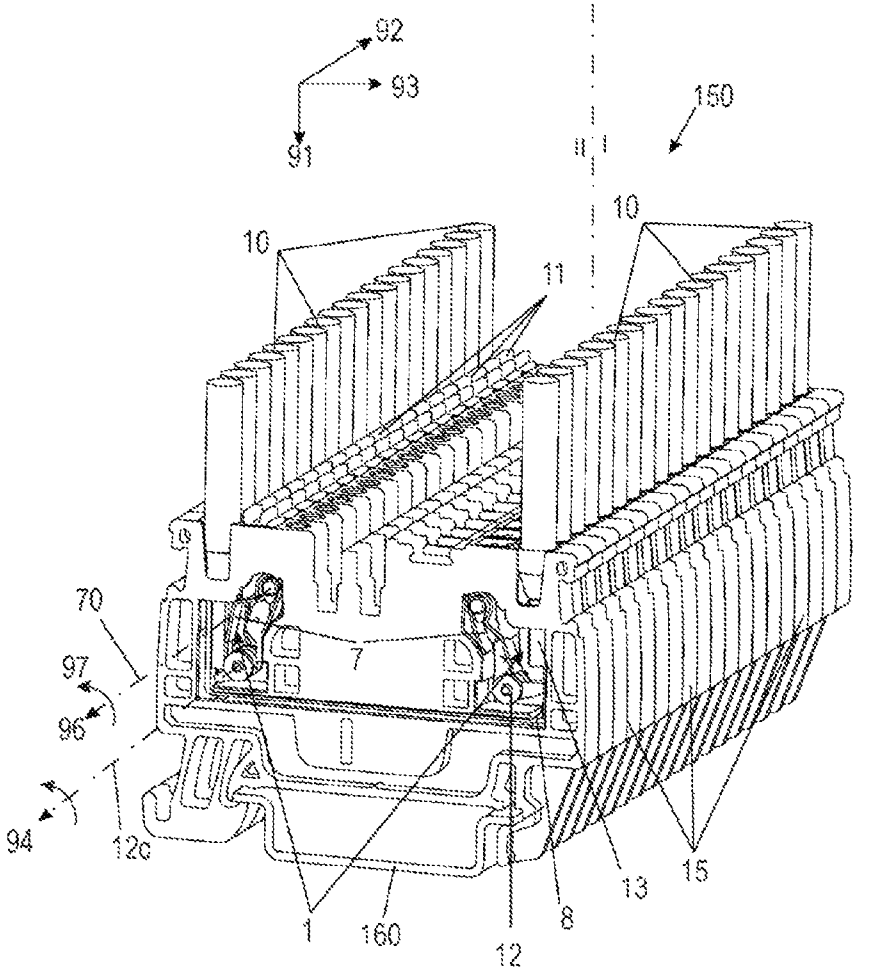
FIG. 9 is a perspective view of a terminal block assembly including a plurality of terminal blocks according to FIG. 7 arranged next to one another in a row.

In each of the spring terminals 1, a respective electrical conductor 10 can be inserted through the conductor insertion channel 5 in an insertion direction 91. The spring terminals 1 with an inserted conductor 10 are shown in FIG. 9.

In the spring terminals 1 arranged on the first side I on the right in the image plane, the pusher 11 is latched with its latching edge 11*h* on the latching edge 31 of the housing 3 in the latching state DR as shown in FIG. 10*a*. As a result, the clamping spring 7 is in the latching state R, in which the clamping limb 7*b* releases the chamber 4 and therefore the chamber is open for the introduction of the electrical conductor 10.

Figure 10D:
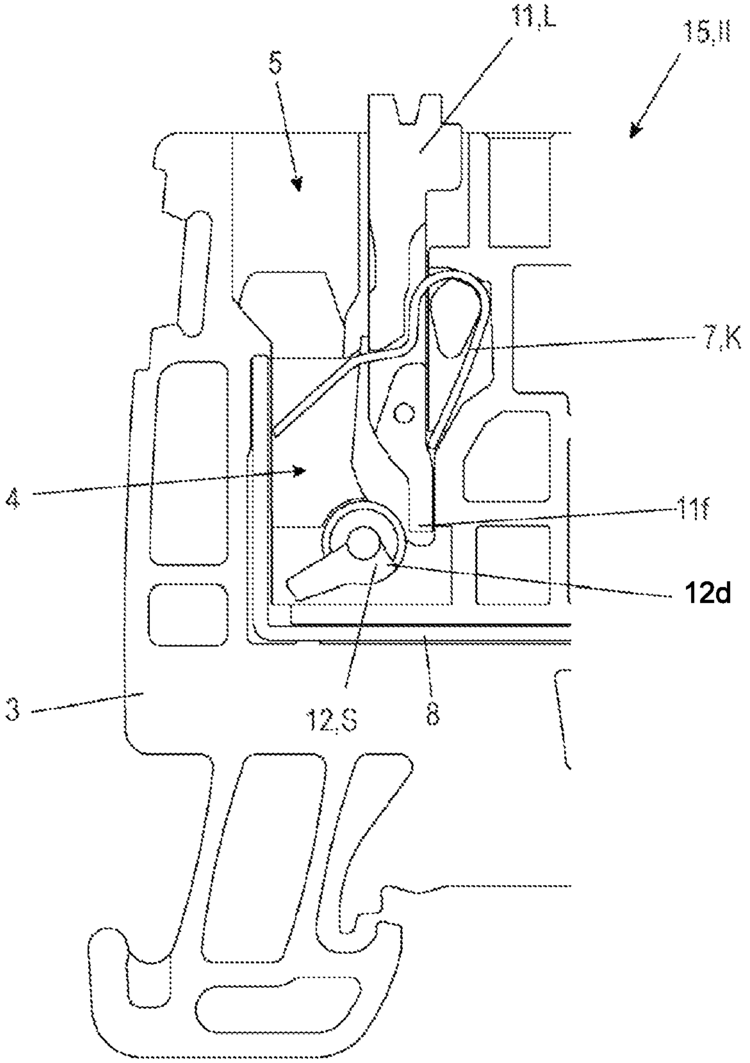

In the spring terminal 1 arranged on the second side II on the left in the image plane, the pusher 11 is in a released, unlatched position L. In this position, the pusher 11 is shifted upward opposite the latching position DR opposite the insertion direction 91. The clamping limb 7*b* is in the closed position K in which it pushes through the chamber 4. FIG. 10*d* also shows this state.

Figure 8A:
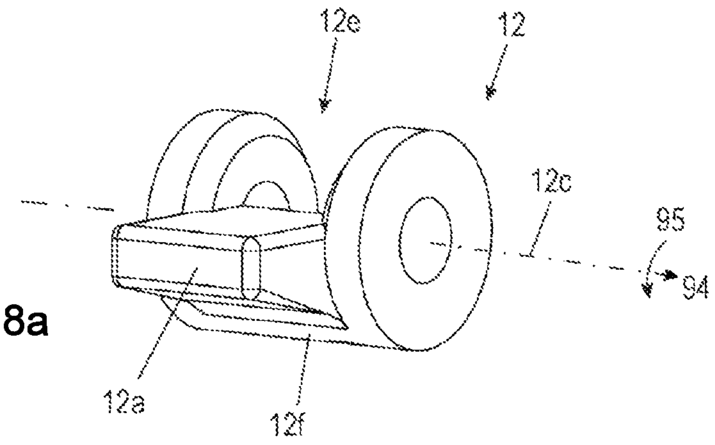
FIGS. 8*a* and 8*b* are different perspective views, respectively of a release element for the spring terminals of the terminal block of FIG. 7.
Figure 8B:
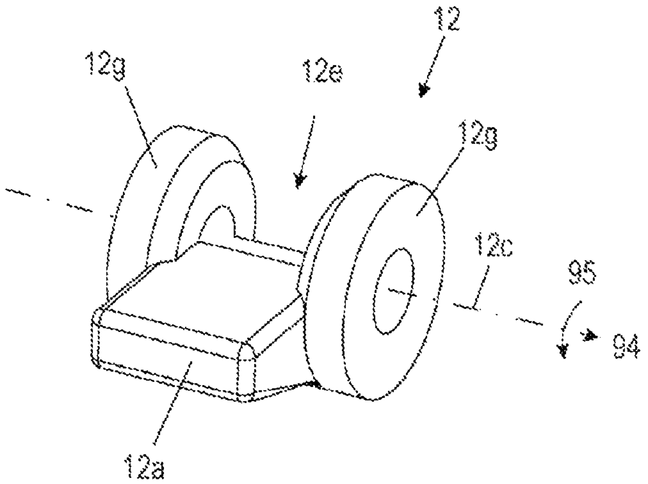

FIGS. 8*a* and 8*b* show the release element 12 for the spring terminals 1 of this terminal block 15 in two perspective views. The release element includes a hollow cylindrical body 12*f* which a respective wheel-shaped widening 12*g* on opposite ends. The hollow cylindrical body 12*f* can be shifted onto the rotation pin 12*c* forming the rotation axis. On the release element 12, a lever arm 12*a* is arranged which can be actuated by the electrical conductor 10 inserted into the spring terminal 1. Between the circular widenings 12*g*, a gap 12*e* is formed into which the end 11*c* of the pusher 11 can be shifted. From an open actuation end proceeding in the direction of the hollow cylindrical body 12*f*, the lever arm 12*a* widens. Slightly below the rotation axis 12*c*, it has an actuation/counter-contour 12*d* (see FIG. 10*a*) which is provided in order to cooperate with an actuation contour 11*f* of the pusher 11. FIG. 9 shows a terminal block assembly 150 with a plurality of terminal blocks 15 according to FIG. 7 arranged in a row next to one another in a stacking direction 92. The terminal block assembly 150 is snapped onto a top-hat rail 160. An electrical conductor 10 is introduced into each of the spring terminals 1.

In the spring terminal 1 arranged on the first side I on the right in the image plane, electrical conductor 10 is not yet clamped. FIG. 10*b* also shows this state.

In the spring terminal 1 arranged in the second side II on the left in the image plane, the electrical conductor 10 is clamped. It actuates the release element 12. FIG. 10*c* also shows this state.

FIGS. 10*a* to 10*d* illustrate a detail of the terminal block 15 according to FIG. 7, wherein the spring terminal 1 is shown in different states.

In FIG. 10*a*, the pusher is in the latched state DR. As a result, the clamping spring 7 is also in the latching state R and the clamping limb 7*b* is adjusted against its resetting force. As a result, the chamber 4 is opened and an electrical conductor 10 can be inserted into the spring terminal 1. The release element 12 is in a base position Gin which the lever arm 12*a* of the release element 12, which is provided for cooperation with the electrical conductor 10, extends in a direction 93 transversely to the insertion direction 91. In this base position G, the actuation/counter-contour 12*d* is arranged under the rotation pin 12*c* forming the rotation axis of the release element 12. Thereby, the pusher 11 is positioned in the gap 12*e* between the circular widenings 12*g* of the hollow cylindrical body 12*f* of the release element 12. This arrangement is very space saving and therefore the spring terminal 1 can be constructed to be very small or narrow.

FIG. 10*b* shows the spring terminal 1 when the electrical conductor 10 is introduced in the chamber 4. The electrical conductor 10 is not yet clamped.

In FIG. 10*c*, the electrical conductor 10 is inserted as far as possible into the chamber 4 so that it actuates the lever arm 12*a* of the release element 12 and this release element is turned in a rotation direction 95. The release element 12 is therefore in a pivoting position S. The pusher 11 is in the released position L. It is shifted by the clamping limb 7*b* by the resetting force of the clamping spring 7 opposite the insertion direction 91. The clamping limb 7*b* pushes the electrical conductor 10 against the clamping cage 13 so that the conductor is clamped in the spring terminal 1.

Due to pivoting of the release element 12, the actuation/counter-current 12*d* is pivoted by the rotation angle. As a result, it is exposed with respect to its position under the rotation pin 12*c*, and the actuation/counter-contour 12*d* for the actuation contour 11*f* of the pusher is easily accessible and actuatable.

Proceeding from this state, the pusher 11 can easily be shifted in the insertion direction 91 and slightly against the transverse direction 93 (perpendicular to the insertion direction), so that the actuation contour 11*f* of the pusher 11 cooperates with the actuation/counter-contour 12*d* of the release element 12, and the release element 12 is rotated back against the rotation direction 95. In the process, the clamping limb 7*b* is pivoted against the resetting force of the clamping spring 7 in the pivoting direction 97, so that it releases the electrical conductor 10. The conductor 10 can then be pulled out of the chamber 4 against the insertion direction 91.

To allow the insertion of another electrical conductor 10 into the chamber 4, the pusher 11 can then be latched again with its latching edge 11*h* on the latching edge 31 of the housing 3. The clamping spring 7 is then again in the state shown in FIG. 10*a*.

Figure 11A:
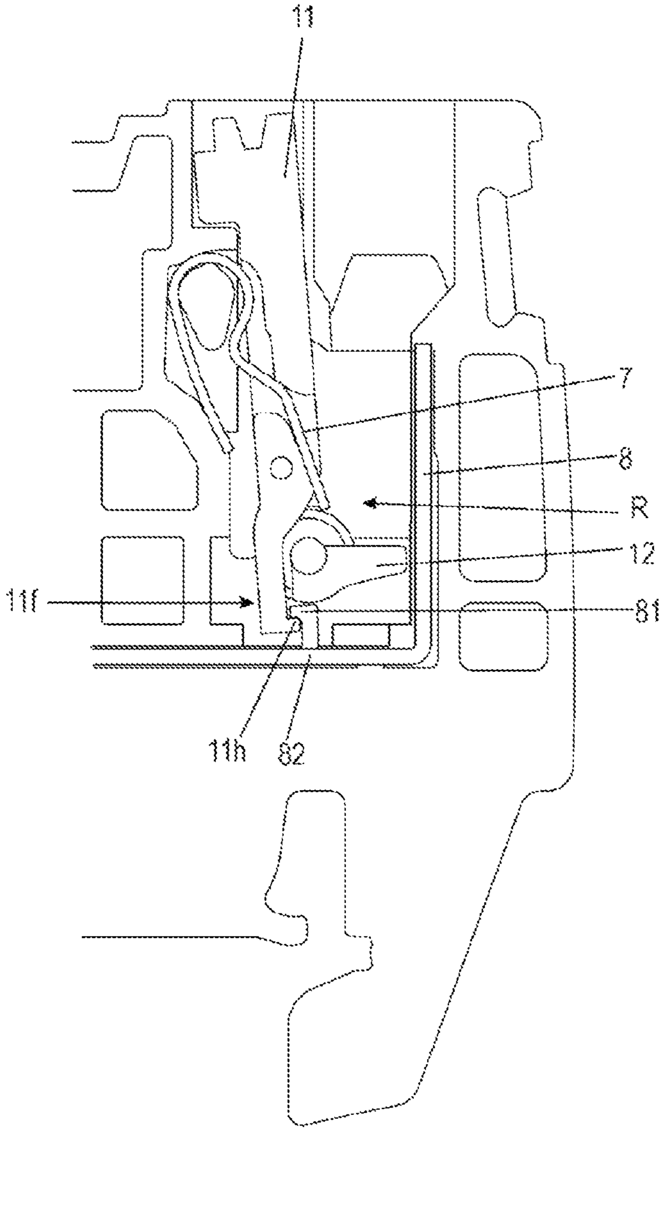
FIGS. 11*a* and 11*b* are partial side views of the terminal block of FIG. 7 showing a second spring terminal in a first latching operating position a second released operating position, respectively, without a conductor.
Figure 11B:
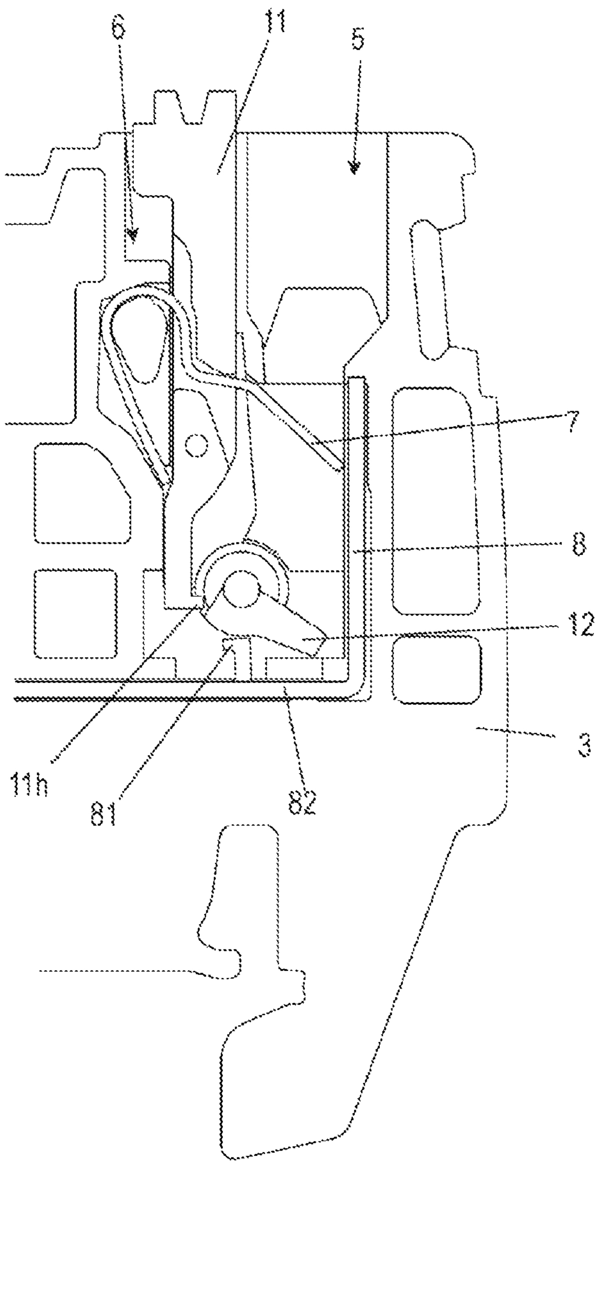
Figure 11C:
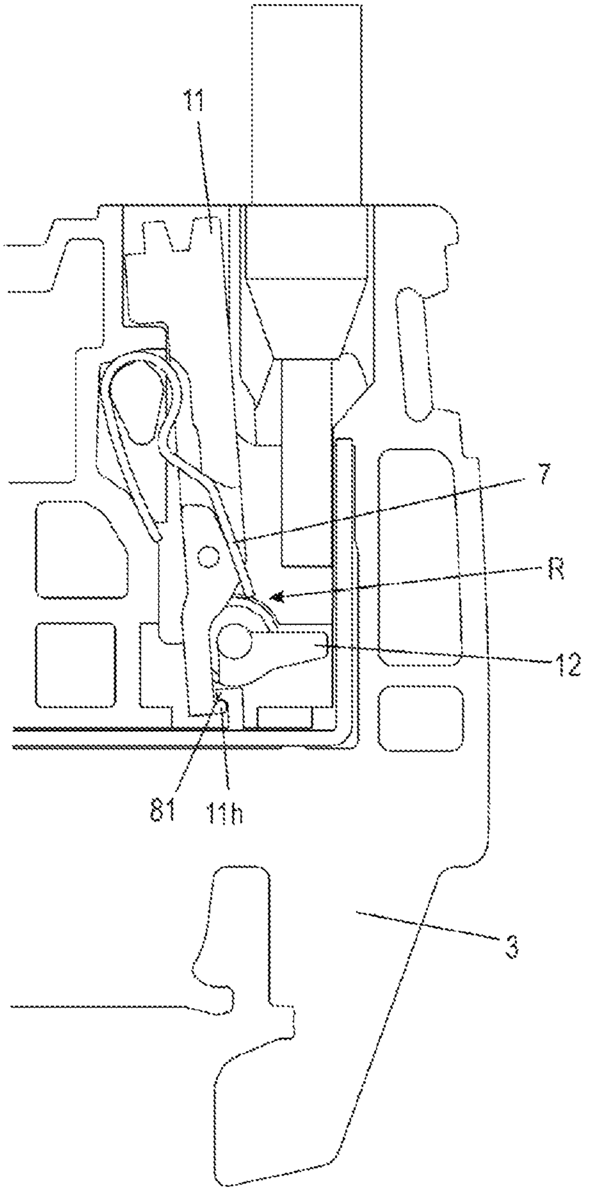
FIGS. 11*c* and 11*d* are partial side views of the terminal block of FIGS. 11*a* and 11*b*, respectively, with a conductor.
Figure 12:
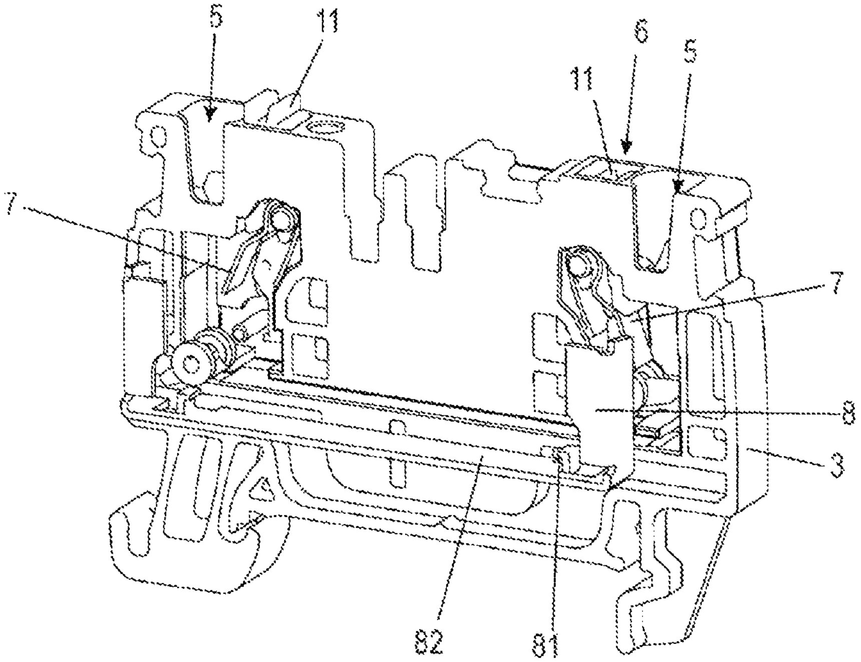
FIG. 12 is a perspective view of the terminal block from FIG. 11 with a separately represented busbar and mounting assembly.

According to FIGS. 11*a* and 11*b* as well as FIGS. 12*c* and 12*d*, the second of the two adjustment devices of the pushers 11 is for moving the clamping limb 7*b*, wherein the pusher 11 can again be shifted in an actuation channel 6 of the housing 3 in the insertion direction X and moved to a limited extent perpendicularly to the insertion direction. It includes a latching edge 11*h* on which it can be latched in the interior of the housing 3 on a latching hook 81 of the busbar 8 or another element arranged in the housing in the latched state R shown in FIG. 11*a*. In this way, the pusher 11 indirectly holds the clamping spring 7 latched in the open position, wherein the latching edge 11*h* in turn can also be released out of the latching state R of FIG. 11*a* by an opposite movement. The released state is represented in FIG. 11*b*. The operation corresponds to the preceding figures, although latching at the end of the pusher 11 toward the busbar is established and released when a conductor is introduced. Reference is made to the description of the preceding figures, the remaining features of which—except for the type of latching of the pusher 11 on the busbar 8 instead of the housing 3—can also be provided according to the embodiment example of FIGS. 11*a* and 11*b* and optionally FIG. 12.

Figure 11D:
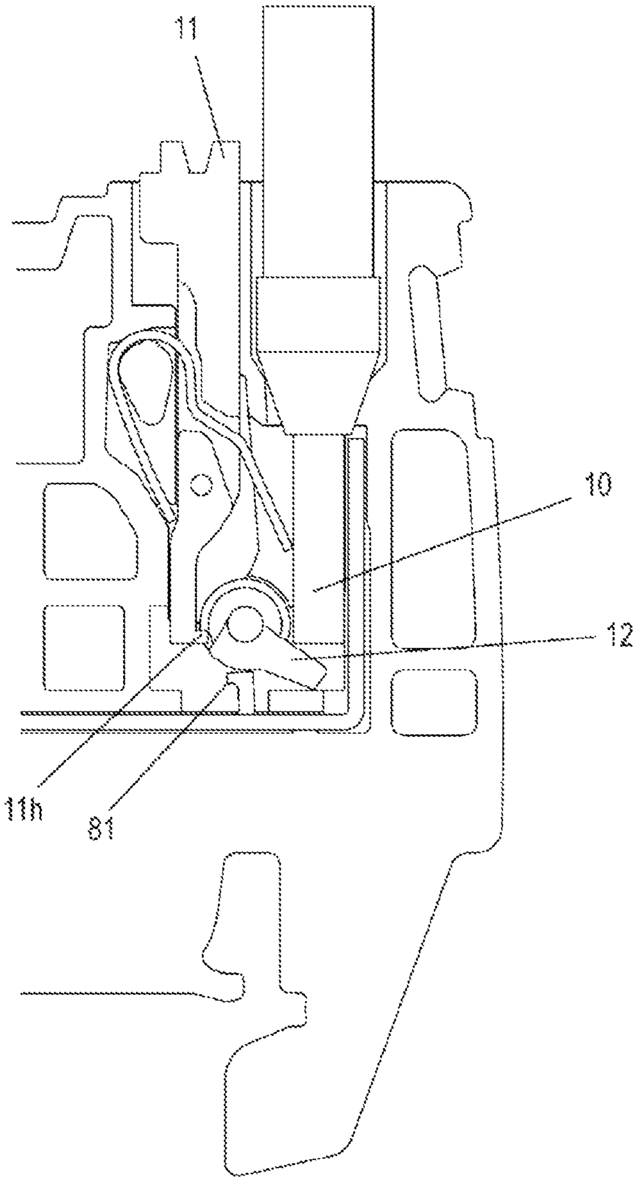

The latching hook 81 on the busbar can be designed as a hook-shaped and/or latching edge-shaped section attached on or bent out of the busbar 8. For this purpose, the latching edge 11*h* is also formed on a kind of hook section of the pusher 11. The latching edge 11*h* can be provided on the lower free end of the pusher 11 (FIGS. 11*a* to 11*d*), and the corresponding latching hook 81 of the busbar can be provided on a busbar section 82 lying under the pusher 11 and the clamping site (relative to the conductor insertion direction). This latching hook can be a busbar section 82 which is used to conductively connect two connections of the busbar. This can be seen particularly clearly in FIG. 12. The latching edge 11*h* lies in the conductor insertion direction after the actuation contour 11*f* of the pusher 11. For release, the pusher 11 only has to be pivoted out of the latching position by a small angle since the lever arm from the rotation bearing of the pusher 11 to the catch on the busbar 8 is relatively long. FIG. 11*d* shows the wired state after the release of the latching state and after the introduction of a conductor 10. This conductor 10 can release latching directly, although release via movement of the pusher 11 can also occur.

The invention claimed is:

1. A spring terminal for connecting a conductor, comprising (a) a housing containing a chamber, an insertion channel for inserting the conductor into said chamber in an insertion direction, and an actuator channel;

(b) one of a busbar and a clamping cage arranged in said chamber and including a latching hook having a hook-shaped configuration;

(c) a clamping spring arranged for pressing on the conductor in a clamping region for connecting the conductor with one of said busbar and clamping cage, said clamping spring including a clamping limb pivotal about a pivot axis between a latching state wherein said clamping limb is spaced from the conductor and a clamping state in which said clamping limb is pressed against the conductor; and (d) an actuator releasing said clamping limb from the latching state, said actuator including (1) a release element engaged by an end of the conductor prior to clamping of the conductor by the clamping spring; and (2) a pusher displaceable within said actuator channel in the insertion direction to a latching position for retaining said clamping limb in the latching state, said actuator channel affording limited movement of said pusher in a direction perpendicular to the insertion direction, said release element being movable to release said pusher from the latching position to release said clamping limb from the latching state to the clamping state, said pusher including a latching edge for engaging said latching hook to retain said clamping spring in the latched state when said pusher is moved in a first direction perpendicular to the insertion direction, said latching edge being released from said latching hook by movement of said pusher in a direction opposite to said first direction to release said clamping spring to the clamping state.

2. The spring terminal as defined in claim 1, wherein said pusher latching edge has a hook-shaped configuration.

3. The spring terminal as defined in claim 1, wherein said pusher includes an actuation contour which cooperates with an actuation/counter-contour of said release element, said release element rotating from a first position about a rotation axis into a pivoting position, said release element actuation/counter-contour being arranged in the first position beneath a rotation pin of said release element adjacent to said pusher latching edge in the insertion direction.

4. The spring terminal as defined in claim 1, wherein said release element is laterally arranged relative to said pusher within said chamber to engage said pusher at an angle relative to the insertion direction to release said pusher from the latching position.

5. The spring terminal as defined in claim 3, wherein when the latched state is released, said release element engages said pusher actuation contour.

6. The spring terminal as defined in claim 4, wherein said angle is less than 45° relative to the insertion direction.

7. The spring terminal as defined in claim 3, wherein said release element comprises a rocker lever pivotably mounted within said housing and includes lever arms formed with a rotation axis.

8. The spring terminal as defined in claim 7, wherein said housing includes a latching edge and said pusher includes a rotation axis arranged above said housing latching edge in the insertion direction.

9. The spring terminal as defined in claim 8, wherein said rotation axis of said pusher is arranged above said clamping limb of said clamping spring in the insertion direction.

10. The spring terminal as defined in claim 9, wherein said rotation axis of said release element is arranged above said pusher actuation contour in the insertion direction.

11. A terminal block comprising at least one spring terminal as defined in claim 1.

12. A spring terminal for connecting a conductor, comprising (a) a housing containing a chamber and an insertion channel for inserting the conductor into said chamber in an insertion direction;

(b) one of a busbar and a clamping cage including a latching hook arranged in said chamber;

(c) a clamping spring arranged in said chamber for pressing on the conductor, said clamping spring including a clamping limb; and (d) a pusher arranged in the chamber and including a latching edge for latching onto said latching hook in a latching state in which said pusher retains said clamping spring in a latched manner in an open position upon movement of said pusher in a first direction, said pusher latching edge being released from the latching state by movement of said pusher in an opposite direction.

13. A terminal block comprising at least one spring terminal as defined in claim 12.

* * * * *